(12) United States Patent
Varteresian et al.

(10) Patent No.: US 10,146,822 B1
(45) Date of Patent: Dec. 4, 2018

(54) AUTOMATED SCRIPT GENERATOR FOR PROCESSING STORAGE SYSTEM DATA FILES

(71) Applicant: EMC Corporation, Hopkinton, MA (US)

(72) Inventors: Michael Varteresian, Lexington, MA (US); Ankur Kasliwal, Boston, MA (US); Jyothi Madallapalli, Milford, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 340 days.

(21) Appl. No.: 14/984,737

(22) Filed: Dec. 30, 2015

(51) Int. Cl.
  *G06F 17/30* (2006.01)

(52) U.S. Cl.
  CPC .. *G06F 17/30339* (2013.01); *G06F 17/30076* (2013.01); *G06F 17/30197* (2013.01); *G06F 17/30292* (2013.01); *G06F 17/30466* (2013.01); *G06F 17/30498* (2013.01); *G06F 17/30867* (2013.01)

(58) Field of Classification Search
  CPC ............ G06F 17/30466; G06F 17/211; G06F 17/30076; G06F 17/300076; G06F 17/30197; G06F 17/30292; G06F 17/30498; G06F 17/30867
  See application file for complete search history.

(56) References Cited

U.S. PATENT DOCUMENTS

| | | | |
|---|---|---|---|
| 7,076,636 B1 | 7/2006 | Chilton | |
| 7,860,879 B2 * | 12/2010 | Gerea | G06F 17/30607 707/769 |
| 8,230,384 B1 | 7/2012 | Krishnan et al. | |
| 8,666,969 B2 * | 3/2014 | Beavin | G06F 17/30448 707/694 |
| 8,700,669 B1 | 4/2014 | Glidewell et al. | |
| 8,707,252 B1 | 4/2014 | Alexeev et al. | |
| 9,207,703 B1 | 12/2015 | Kancharla | |
| 2014/0358932 A1 * | 12/2014 | Brown | G06F 17/30445 707/741 |
| 2016/0092476 A1 * | 3/2016 | Stojanovic | G06F 3/04847 707/805 |

(Continued)

*Primary Examiner* — Heather Herndon
*Assistant Examiner* — Merilyn Nguyen
(74) *Attorney, Agent, or Firm* — BainwoodHuang

(57) ABSTRACT

Described are methods, systems, and apparatus, including computer program products for generating a computer-executable script for processing storage system data files. Storage system data files are selected based on data structure description files, and computer-executable statements are generated for loading the selected files into storage system data tables. Storage system data fields are selected from the tables based on data structure description files, and computer-executable statements are generated for filtering the tables based on the selected fields. A join sequence is determined based on properties of the filtered tables, and computer-executable statements are generated for joining the filtered tables based on the join sequence. The joined table is formatted based on data structure description files, and computer-executable statements are generated for creating an output based on the formatted joined table. A computer-executable script is generated based on the computer-executable statements, and is committed to a file system.

20 Claims, 4 Drawing Sheets

(56) References Cited

U.S. PATENT DOCUMENTS

2016/0132510 A1* 5/2016 Vickers .................... G06F 8/51
                                                        707/756
2017/0046420 A1* 2/2017 Fuchs ....................... G06F 9/46

* cited by examiner

| 205 | 210 | 215 | 220 | 225 | 230 | 235 |
|---|---|---|---|---|---|---|
| ConnectHome | PK_ConnectHomeKey | Master.UEM_CallHomes | pk_uem_call_home | varchar(50) | FALSE | null |
| ConnectHome | SchemaVersion | Master.UEM_CallHomes | schema_version | varchar(10) | TRUE | unknown |
| ConnectHome.Node | Status | Master.UEM_CallHomes | system_state | varchar(10) | TRUE | unknown |
| ConnectHome.Node | PK_NodeKey | UNKNOWN | UNKNOWN | UNKNOWN | FALSE | UNKNOWN |
| ConnectHome.Node | FK_ConnectHomeKey | UNKNOWN | UNKNOWN | UNKNOWN | FALSE | UNKNOWN |
| ConnectHome.Node.Identifier | EmbedLevel | Master.UEM_CallHomes | attachment_embedded_level | int2 | TRUE | 0 |
| ConnectHome.Node.Identifier | PK_IdentifierKey | UNKNOWN | UNKNOWN | UNKNOWN | FALSE | UNKNOWN |
| ConnectHome.Node.Identifier | FK_NodeKey | UNKNOWN | UNKNOWN | UNKNOWN | FALSE | UNKNOWN |
| ConnectHome.Node.Identifier | InternalMaxSize | Master.UEM_CallHomes | attachment_max_size_bytes | int8 | TRUE | 0 |
| ConnectHome.Node.Identifier | DeviceType | Master.UEM_CallHomes | device_type | varchar(10) | FALSE | null |
| ConnectHome.Node.Identifier | Platform | Master.UEM_CallHomes | platform | varchar(16) | TRUE | unknown |
| ConnectHome.Node.Identifier | Model | Master.UEM_CallHomes | model | varchar(10) | TRUE | unknown |
| ConnectHome.Node.Identifier | SiteName | Master.UEM_CallHomes | reported_site_name | varchar(64) | TRUE | unknown |
| ConnectHome.Node.Identifier | UcodeVer | Master.UEM_CallHomes | reported_software_block | varchar(30) | TRUE | unknown |
| ConnectHome.Node.Identifier | OS_VER | Master.UEM_CallHomes | reported_software_file | varchar(30) | TRUE | unknown |
| ConnectHome.Node.Identifier | SerialNumber | Master.UEM_CallHomes | serial_number | varchar(32) | FALSE | null |

"rules.csv"

┌─────────────────────────────────────────────────────────────────────┐
│ 305 Select storage system data files from the plurality of storage system data files based on |
│ one or more data structure description files                                                   │
└─────────────────────────────────────────────────────────────────────┘
                                    ↓
┌─────────────────────────────────────────────────────────────────────┐
│ 310 Generate one or more computer-executable statements for loading the selected storage       │
│ system data files into storage system data files                                               │
└─────────────────────────────────────────────────────────────────────┘
                                    ↓
┌─────────────────────────────────────────────────────────────────────┐
│ 315 Select one or more storage system data fields from the storage system data tables based   │
│ on the one or more data structure description files                                            │
└─────────────────────────────────────────────────────────────────────┘
                                    ↓
┌─────────────────────────────────────────────────────────────────────┐
│ 320 Generate one or more computer-executable statements for filtering the storage system       │
│ data tables based on the selected storage system data fields                                   │
└─────────────────────────────────────────────────────────────────────┘
                                    ↓
┌─────────────────────────────────────────────────────────────────────┐
│ 325 Determine a join sequence for joining the filtered storage system data tables based on one │
│ or more properties of the filtered storage system data tables                                  │
└─────────────────────────────────────────────────────────────────────┘
                                    ↓
┌─────────────────────────────────────────────────────────────────────┐
│ 330 Generate one or more computer-executable statements for joining the filtered storage       │
│ system data tables into a joined table based on the join sequence                              │
└─────────────────────────────────────────────────────────────────────┘
                                    ↓
┌─────────────────────────────────────────────────────────────────────┐
│ 335 Format the joined table based on the one or more data structure description files          │
└─────────────────────────────────────────────────────────────────────┘
                                    ↓
┌─────────────────────────────────────────────────────────────────────┐
│ 340 Generate one or more computer-executable statements for creating an output based on the    │
│ formatted joined table                                                                         │
└─────────────────────────────────────────────────────────────────────┘
                                    ↓
┌─────────────────────────────────────────────────────────────────────┐
│ 345 Generate the computer-executable script based on the one or more computer-executable       │
│ statements for loading the selected storage system data files into storage system data tables, │
│ the one or more computer-executable statements for filtering the storage system data tables,   │
│ the one or more computer-executable statements for joining the filtered storage system data    │
│ tables into a joined table based on the join sequence, and the one or more computer-           │
│ executable statements for creating an output based on the formatted joined table               │
└─────────────────────────────────────────────────────────────────────┘
                                    ↓
┌─────────────────────────────────────────────────────────────────────┐
│ 350 Commit the computer-executable script to a file system in communication with the output    │
│ processing module                                                                              │
└─────────────────────────────────────────────────────────────────────┘

FIG. 3

AUTOMATED SCRIPT GENERATOR FOR PROCESSING STORAGE SYSTEM DATA FILES

FIELD OF THE TECHNOLOGY

The present technology generally relates to storage systems and, more specifically, to generating computer-executable scripts for parsing and manipulating storage system data files.

BACKGROUND

In some applications, storage systems can generate telemetry data that provides information about system status, performance, operation, and other parameters. However, the current IT data processing infrastructure cannot meet the demands caused by an explosion in the volume of telemetry data due to the rapid growth of the storage system install base and the increased variability of the available telemetry data. Further, the current technology for processing the incoming telemetry data relies on a scripting process that is incapable of dynamically adapting to changes in both the telemetry data and variability in the desired output formats for presenting the telemetry data.

SUMMARY OF THE TECHNOLOGY

In one aspect, there is a system for generating a computer-executable script for processing a plurality of storage system data files. The system can include a preprocessing module configured to select selected storage system data files from the plurality of storage system data files based on one or more data structure description files, and generate one or more computer-executable statements for loading the selected storage system data files into storage system data tables. The system can include a content filtering module configured to select one or more storage system data fields from the storage system data tables based on the one or more data structure description files, and generate one or more computer-executable statements for generating filtered storage system data tables by filtering the storage system data tables based on the selected storage system data fields. The system can include a join sequence module configured to determine a join sequence for joining the filtered storage system data tables based on one or more properties of the filtered storage system data tables, and generate one or more computer-executable statements for joining the filtered storage system data tables into a joined table based on the join sequence. The system can include a data normalization module configured to format the joined table based on the one or more data structure description files, and generate one or more computer-executable statements for creating an output based on the formatted joined table. The system can include an output conditioning module configured to generate the computer-executable script based on the one or more computer-executable statements for loading the selected storage system data files into storage system data tables, the one or more computer-executable statements for generating filtered storage system data tables by filtering the storage system data tables, the one or more computer-executable statements for joining the filtered storage system data tables into the joined table based on the join sequence, and the one or more computer-executable statements for creating the output, and commit the computer-executable script to a file system in communication with the output conditioning module.

In some embodiments, the selected storage system data files are a subset of the plurality of storage system data files. In some embodiments, the content filtering module is further configured to generate computer-executable statements for removing storage system data fields from the selected storage system data tables that do not match one of the selected storage system data fields. In some embodiments, the join sequence module is further configured to determine a join sequence for joining the filtered storage system data tables based on one or more of: a size of each filtered storage system data table, a number of columns of data in each filtered storage system data table, a number of rows of data in each filtered storage system data table, and a commonality between the storage system data tables.

In some embodiments, the system can include a graphical user interface module configured to generate the one or more data structure description files based on a selection of storage system data fields by a user. In some embodiments, the computer-executable script includes computer-executable statements expressed in the Pig Latin programming language. In some embodiments, the output conditioning module commits the computer-executable script to a Hadoop Distributed File System. In some embodiments, the computer-executable script is configured to process storage system data files stored in a Hadoop Distributed File System.

In another aspect, there is a computer-implemented method executed on a computing device for generating a computer-executable script for processing a plurality of storage system data files. The method can include selecting, by the computing device, storage system data files from the plurality of storage system data files based on one or more data structure description files. The method can include generating, by the computing device, one or more computer-executable statements for loading the selected storage system data files into storage system data tables. The method can include selecting, by the computing device, one or more storage system data fields from the storage system data tables based on the one or more data structure description files. The method can include generating, by the computing device, one or more computer-executable statements for generating filtered storage system data tables by filtering the storage system data tables based on the selected storage system data fields. The method can include determining, by the computing device, a join sequence for joining the filtered storage system data tables based on one or more properties of the filtered storage system data tables. The method can include generating, by the computing device, one or more computer-executable statements for joining the filtered storage system data tables into a joined table based on the join sequence. The method can include formatting, by the computing device, the joined table based on the one or more data structure description files. The method can include generating, by the computing device, one or more computer-executable statements for creating an output based on the formatted joined table. The method can include generating, by the computing device, the computer-executable script based on the one or more computer-executable statements for loading the selected storage system data files into storage system data tables, the one or more computer-executable statements for generating filtered storage system data tables by filtering the storage system data tables, the one or more computer-executable statements for joining the filtered storage system data tables into a joined table based on the join sequence, and the one or more computer-executable statements for creating an output. The method can include committing, by the computing device, the computer-executable script to a file system in communication with the computing device.

In some embodiments of the method, selecting selected storage system data files from the plurality of storage system data files comprises selecting a subset of the plurality of storage system data files. In some embodiments of the method, generating one or more computer-executable statements for generating filtered storage system data tables by filtering the storage system data tables further comprises generating, by the computing device, computer-executable statements for removing storage system data fields from the selected storage system data tables that do not match one of the selected storage system data fields.

In some embodiments, the method can include determining, by the computing device, the join sequence for joining the filtered storage system data tables based on one or more of: a size of each filtered storage system data table, a number of columns of data in each filtered storage system data table, a number of rows of data in each filtered storage system data table, and a commonality between the storage system data tables. In some embodiments, the method can include generating, by the computing device, the one or more data structure description files based on a selection of storage system data fields by a user.

In some embodiments of the method, the computer-executable script is expressed in the Pig Latin programming language. In some embodiments, the method can include committing, by the computing device, an output of the computer-executable script to a Hadoop Distributed File System. In some embodiments, the method can include configuring, by the computing device, the computer-executable script to process storage system data files stored in a Hadoop Distributed File System.

In another aspect, there is a computer program product, tangibly embodied in a non-transitory computer readable storage medium, comprising instructions being operable to cause a computing device to: select selected storage system data files from a plurality of storage system data files based on one or more data structure description files; generate one or more computer-executable statements for loading the selected storage system data files into storage system data tables; select one or more storage system data fields from the storage system data tables based on the one or more data structure description files; generate one or more computer-executable statements for generating filtered storage system data tables by filtering the storage system data tables based on the selected storage system data fields; determine a join sequence for joining the filtered storage system data tables based on one or more properties of the filtered storage system data tables; generate one or more computer-executable statements for joining the filtered storage system data tables into a joined table based on the join sequence; format the joined table based on the one or more data structure description files; generate one or more computer-executable statements for creating an output based on the formatted joined table; generate a computer-executable script based on the one or more computer-executable statements for loading the selected storage system data files into storage system data tables, the one or more computer-executable statements for generating filtered storage system data tables by filtering the storage system data tables, the one or more computer-executable statements for joining the filtered storage system data tables into a joined table based on the join sequence, and the one or more computer-executable statements for creating the output; and commit the computer-executable script to a file system in communication with the computing device.

In some embodiments the computer program product includes instructions being operable to cause a computing device to select a subset of the plurality of storage system data files. In some embodiments the computer program product includes instructions being operable to cause a computing device to generate computer-executable statements for removing storage system data fields from the selected storage system data tables that do not match one of the selected storage system data fields. In some embodiments, the computer program product includes instructions being operable to cause a computing device to determine the join sequence for joining the filtered storage system data tables based on one or more of: a size of each filtered storage system data table, a number of columns of data in each filtered storage system data table, a number of rows of data in each filtered storage system data table, and a commonality between the storage system data tables. In some embodiments, the computer program product includes instructions being operable to cause a computing device to generate the one or more data structure description files based on a selection of storage system data fields by a user In some embodiments of the computer program product, the computer-executable script is expressed in the Pig Latin programming language. In some embodiments, the computer program product includes instructions being operable to cause a computing device commit an output of the computer-executable script to a Hadoop Distributed File System. In some embodiments, the computer program product includes instructions being operable to cause a computing device to configure the computer-executable script to process storage system data files stored in a Hadoop Distributed File System.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which:

FIG. 2 depicts a data structure description file in accordance with the technology.

FIG. 3 illustrates a flow diagram illustrating a method in accordance with the technology.

DETAILED DESCRIPTION

The technology described herein can facilitate the automated generation of a computer-executable script for parsing and manipulating a dynamically-updating corpus of storage system data files, including telemetry data sourced from various deployed storage systems.

Figure 1:
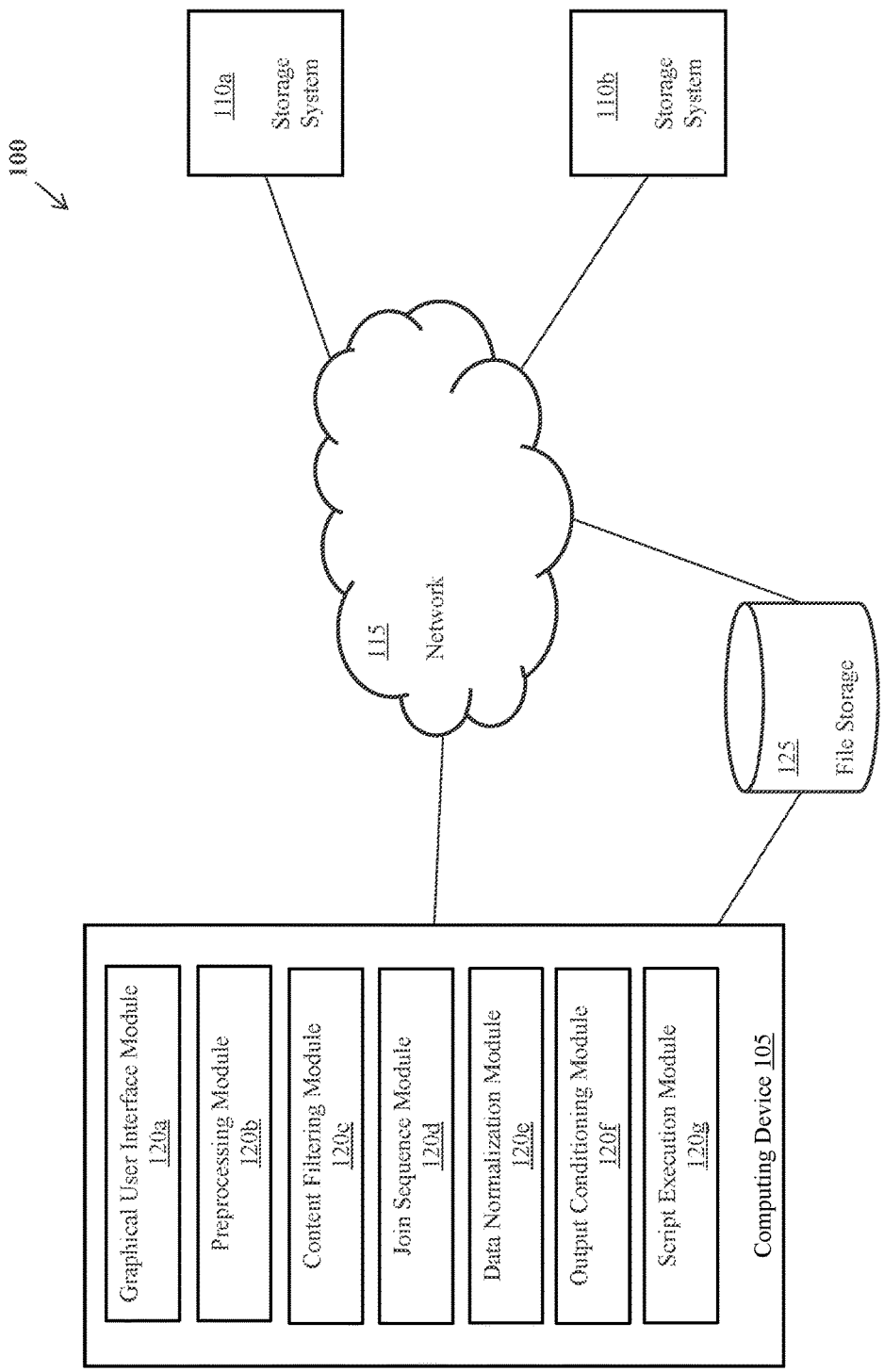
FIG. 1 depicts a system in accordance with the technology.

FIG. 1 depicts system 100 in accordance with the technology. System 100 includes computing device 105, storage systems 110a and 110b (collectively referred to as storage systems 110), and file storage 125. Computing device 105 can include one or more computing devices. File storage 125 can include one or more storage devices. In some embodiments, file storage 125 is a hard disk, disk array, or another computing device capable of storing computer data. In some embodiments, file storage 125 is an integral component of computing device 105. Computing device 105 and file storage 125 can be in direct data communication with each other via a wired connection (e.g., USB, Firewire, eSATA, etc.), or via short range wireless connection (e.g., Bluetooth, Zigbee, infrared, NFC, etc.). Further, computing device 105 and file storage 125 can be in communication via communications network 115 as described below.

Storage systems 110 can each include one or more storage systems. In some embodiments, a storage system can include one or more storage processors, disk enclosures, disk arrays, and/or storage devices (e.g., solid state or magnetic disk drives). It should be appreciated that system 100 is an exemplary system in accordance with the technology, and other configurations are contemplated. For example, the computing device can itself be a software module running on a back-end server, or storage systems 110.

Computing device 105 and storage systems 110 include network-interface components (not shown) to connect to communications network 115. In some embodiments, the network-interface components include components to connect to a wired communications network, such as a telephone, cable television, or fiber optic network. In some embodiments, the network-interface components include components to connect to a wireless network, such as a Wi-Fi or cellular network, in order to access a wider network, such as the Internet.

Communications network 115 facilitates data communications between computing device 105 and storage systems 110. In some embodiments, computing device 105 and/or storage systems 110 communicate with file storage 125 over communications network 115. Communications network 115 can be a local network, such as a LAN, or a wide area network ("WAN"), such as the Internet and/or a cellular network. Communications network 115 may alternatively comprise components of both a LAN and a WAN, or any other type of network known in the art.

As shown in FIG. 1, computing device 105 includes a number of modules 120. Computing device 105 includes graphical user interface ("GUI") module 120a, preprocessing module 120b, content filtering module 120c, join sequence module 120d, data normalization module 120e, output conditioning module 120f, and script execution module 120g. Modules 120a-120g are hardware and/or software modules located in computing device 105 and used during operation of the technology described herein. In some embodiments, the functionality of modules 120 is distributed among a plurality of computing devices. It should be appreciated that any number of computing devices, arranged in a variety of architectures and configurations (e.g., cluster computing, virtual computing, cloud computing) can be used without departing from the scope of the invention.

During operation of system 100, each storage system 110 generates telemetry data related to its status, performance, operation, and other parameters. For example, telemetry data can include identification and status information about the storage system such as a device ID or serial number, vendor and model information, the name of the installed operating system and its version, and the current operational state of the storage system. Telemetry data can also include information obtained from sensors associated with the physical components of the storage system. For example, telemetry data can be obtained from one or more thermocouples for sensing the temperature at locations within the storage system, or from one or more sensors indicating the rotational speed of the storage server's cooling fans.

Each storage system 110 can collect various telemetry data at fixed intervals of time (e.g., once per second, once per hour, once per day, etc.) or in response to a poll or request from another device in system 100, such as computing device 105. Storage system 110 can store the collected telemetry data to one or more telemetry data files (e.g., storage system data files) that it creates or that exist in system 100. For example, storage system 110 can be programmed to store telemetry data to several distinct telemetry data files, each file for grouping similar types of telemetry data. Telemetry data files can be provided to computing device 105 from storage systems 110 at fixed intervals of time. In some embodiments, storage systems 110 provide telemetry data files to computing device 105 in response to a query or request from computing device 105.

Telemetry data files can be formatted as comma-delimited (".csv") files organized as columns and rows (e.g., tabular format). For example, a first row of the telemetry data file can include a set of column names which correspond to the particular telemetry data types or fields that are collected and stored in that file. Each row that follows the column names includes a value for each column based on a unique instance of telemetry data that is collected. Each time another instance of telemetry data is collected, a new row is added to the telemetry data file to store the additional telemetry data values. In some embodiments, storage system 110 does not collect telemetry data for every column (e.g., telemetry data field) in the telemetry data file. For example, a storage server may not have the capability to sample a particular telemetry data value based on the revision of its hardware or operating system software. In such cases, the value for the non-sampled telemetry data field can be left blank, set to zero, set to UNKNOWN, or some other default value provided for by the storage server software. These attributes can allow the technology described herein to handle multiple versions of the telemetry data files from various storage systems. In some embodiments, the telemetry data files are raw, unstructured .txt, XML, or JSON files that are converted to .csv files prior to being processed by the technology described herein.

System 100 can utilize a master input file that describes the structure of possible telemetry data files and the corresponding telemetry data fields that can be received from storage systems 110. In the example below, a master input file named "input.csv" lists the name of each telemetry data file followed by a list of the telemetry data fields that are included in the associated telemetry data file. The telemetry data fields listed under each telemetry data file name are the column names in the actual telemetry data file. A semicolon is used to denote the last data field of each telemetry data file listed in input.csv.

input.csv:
ConnectHome.Node.Identifier,
   PK_IdentifierKey,
   FK_NodeKey,
   DeviceState,
   DeviceStatus,
   ClarifyID,
   SiteName,
   Vendor,
   DeviceType,
   Model,
   SerialNumber,
   WWN,
   Platform,
   OS,
   OS_VER,
   UcodeVer,
   EmbedLevel,
   InternalMaxSize,
   Comment;
ConnectHome.Node.Connection,
   PK_ConnectionKey,
   FK_NodeKey,
   ConnectType,
   AccessType,
   Version,
   InPolicy,
   OutPolicy,
   RouterIP,
   IPAddress,
   IPName,
   NAT_IP,
   EMC_IP,
   State,
   Time,
   UserID,
   AppName,
   UdpSocket,
   ConnectNum,
   Port;
ConnectHome.Node.Event,
   PK_EventKey,
   FK_NodeKey,
   SymptomCode,
   Category,
   Severity,
   Status,
   Component,
   ComponentID,
   SubComponent,
   SubComponentID,
   CallHome,
   FirstTime,
   LastTime,
   Count,
   EventData,
   Description;
ConnectHome.Node,
   PK_NodeKey,
   FK_ConnectHomeKey,
   Status,
   State,
   ID;
ConnectHome,
   PK_ConnectHomeKey,
   SchemaVersion,
   TransType,
   TransTypeDesc,
   TransID;

In this simplified example, there are a total of five possible telemetry data files that may be received from storage systems 110 (e.g., ConnectHome.Node.Identifier, ConnectHome.Node.Connection, ConnectHome.Node.Event, ConnectHome.Node, and ConnectHome), and each telemetry data file includes between five and nineteen telemetry data fields. For example, ConnectHome includes the following telemetry data fields: PK_ConnectHomeKey, SchemaVersion, TransType, TransTypeDesc, and TransID. However, it should be appreciated that a master input file can include a listing of any number of telemetry data files, and each telemetry data file can include any number of telemetry data fields.

In some embodiments, the master input file further includes information about the relationships between the telemetry data fields present in the various telemetry data files. For example, the master input file can include information about a parent-child relationship between the data fields in different telemetry data files. The master input file can include information about telemetry data fields from various telemetry data files that correspond despite having different data field names. In some embodiments, information about the relationships between the telemetry data fields present in the various telemetry data files is stored in a metadata file separate from the master input file.

System 100 can utilize a master output file specifying the structure of one or more telemetry data output file formats for files that can be generated by the computer-executable script. For example, the master output file can specify the output filename as well as which telemetry data fields are to be included as columns in the output generated by the computer-executable script. The master output file can further specify attributes of the telemetry data fields that will be included in the output. In some embodiments, the master output file specifies an output file format for a .csv file.

In the example below, a master output file named "output.csv" lists the name of three possible output files followed by a list of the telemetry data fields that are included in the associated output file. Below the name of each telemetry data field are the corresponding attributes for that data field such as the data type and length (e.g., 8-bit integer, 10-character string, etc.), an attribute indicating whether the data field can be assigned a null value, and whether there is a default value for the data field when no value is provided in the source telemetry data files from storage systems 110. A semicolon is used to denote the last data field of each output data file listed in output.csv.

master.csv:
UEM_Master
  pk_uem_master
    {data_type int8} {allow_nulls false}
  serial_number
    {data_type varchar(20)} {allow_nulls false}
  product_item_id
    {data_type int4} {allow_nulls false}
  software_release_id
    {data_type int4} {allow_nulls false}
  start_date
    {data_type timestamp} {allow_nulls false}
  end_date
    {data_type timestamp} {allow_nulls false};
Master.UEM_CallHomes
  pk_uem_call_home
    {data_type varchar(50)} {allow_nulls false}
  fk_uem_master
    {data_type varchar(50)} {allow_nulls false}
  attachment_embedded_level
    {data_type int2} {allow_nulls true} {default_val 0}
  attachment_max_size_bytes
    {data_type int8} {allow_nulls true} {default_val 0}
  device_type
    {data_type varchar(10)} {allow_nulls false}
  ip_address
    {data_type varchar(50)} {allow_nulls true} {default_val unknown}
  platform
    {data_type varchar(16)} {allow_nulls true} {default_val unknown}
  event_time
    {data_type timestamp} {allow_nulls true}
  model
    {data_type varchar(10)} {allow_nulls true} {default_val unknown}
  reported_site_name
    {data_type varchar(64)} {allow_nulls true} {default_val unknown}
  reported_software_block
    {data_type varchar(30)} {allow_nulls true} {default_val unknown}
  reported_software_file
    {data_type varchar(30)} {allow_nulls true} {default_val unknown}
  schema_version
    {data_type varchar(10)} {allow_nulls true} {default_val unknown}
  serial_number
    {data_type varchar(32)} {allow_nulls false}
  software_release_id
    {data_type int4} {allow_nulls false} {default_val 0}
  system_state
    {data_type varchar(10)} {allow_nulls true} {default_val unknown}
  system_status
    {data_type varchar(10)} {allow_nulls true} {default_val unknown}
  udoctor_version_id
    {data_type int4} {allow_nulls true} {default_val 0}
  vendor
    {data_type varchar(20)} {allow_nulls true} {default_val unknown};
Master.UEM_CallHomeEvents
  pk_uem_call_home_event
    {data_type varchar(50)} {allow_nulls false}
  fk_uem_call_home
    {data_type varchar(50)} {allow_nulls false}
  category
    {data_type varchar(10)} {allow_nulls true} {default_val unknown}
  event_time
    {data_type timestamp} {allow_nulls true}
  event_description
    {data_type text} {allow_nulls true}
  severity
    {data_type varchar(10)} {allow_nulls true} {default_val unknown}
  status
    {data_type varchar(10)} {allow_nulls true} {default_val unknown}
  symptom_id
    {data_type int4} {allow_nulls true} {default_val 0};

In this simplified example, the master output file specifies the format of three possible output files (i.e., UEM_Master, Master.UEM_CallHomes, and Master.UEM_CallHomeEvents), and each output file includes between six and nineteen telemetry data fields. However, it should be appreciated that a master output file can include a listing of any number of output file formats, and each output file can include any number of telemetry data fields.

During operation of system 100, GUI module 120a can take the input and output master files as input, and generates a graphical user interface ("GUI") that can be displayed to a user using a display device (e.g., computer monitor) connected to computing device 105. GUI module 120a reads the master input file and presents to the user all of the possible telemetry data fields defined in the system based on the superset of telemetry data files listed in the master input file. GUI module 120a further reads the master output file and presents the different templates for output file formats based on selections by the user. In some embodiments, the GUI includes a pulldown menu for selecting the filename of an output file format template, and upon selection of an output file template, the GUI displays the corresponding telemetry data fields that would be included in the output generated by the computer-executable script. By way of the "output.csv" example above, in response to selection of "UEM_Master.csv" using the pulldown menu, the GUI would display the pk_uem_master, serial_number, product_item_id, software_release_id, start_date, and end_date data fields to the user.

After selection of an output file template, the GUI provides the user the option to select telemetry data fields from the master input file to map to telemetry data fields of the output file template that will be included in the computer-executable script output. Further, the GUI allows the user to only map telemetry data fields from the master input file to a subset of the telemetry data fields of the output file template if desired. Continuing the "output.csv" example, upon selection of the output file format template "UEM_Master" using the pulldown menu, the user may choose to only map telemetry data fields from the master input file to the serial_number, product_item_id, and software_release_id data fields. In this case, the computer-executable script will be configured to output only those three telemetry data fields upon execution.

In response to the selection and mapping of telemetry data fields as described above, GUI module 120a can generate one or more data structure description files indicating the rules for mapping telemetry data fields from the telemetry data files of input.csv to telemetry data fields from the output file template. For example, GUI module 120a can generate a mapping rules file describing the relationship between the telemetry data files from input.csv for which one or more telemetry data fields were mapped to telemetry data fields of the output file template selected from output.csv. The mapping rules file can also specify attributes of the telemetry data fields according to the selected output file template.

In addition, the mapping rules file can include telemetry data fields from the telemetry data files that were not mapped to a telemetry data field of the output file template, but are used in order to perform a join operation on the data from the telemetry data files, as described in more detail with respect to join sequence module 120d below. For example, when telemetry data fields from several distinct telemetry data files are selected and mapped to telemetry data fields of the output file template, executing the generated script causes the computing device to join the columns corresponding to the related telemetry data fields from a column or columns common to the two or more telemetry data files, or based on columns from the telemetry data files that may be different, but have a known relationship to each other (e.g., parent-child).

GUI module 120a determines which columns, if any, from each selected telemetry data file can be used to join the other telemetry data files based on the telemetry data field relationship information in the master input file (e.g., input.csv), or alternatively, in a separate metadata file. Joining related columns from different telemetry data files on a common telemetry data field can allow the corresponding telemetry data from different telemetry data files to be in the same row, ensuring that all of the data in the resulting row created by the computing device executing the generated script refers to the same device (e.g., storage server), collection instance, etc.

GUI module 120a creates a mapping rules file (e.g., rules.csv) that includes all of the column names that were mapped to an output column name, and additional columns from each telemetry data file that can be used to join the selected columns of the telemetry data files. In some embodiments, all of the columns that can potentially be used to join the selected columns of the telemetry data files are included as additional columns in the rules mapping file. In some embodiments, a utility operating in tandem with GUI module 120a is used to create the mapping rules file.

FIG. 2 depicts an exemplary data structure description file 200 ("rules.csv") according to the technology described herein. In this example, it can be determined based on the data in column 215 that "Master.UEM_Callhomes" is the selected output file template. Further, column 220 shows the subset of telemetry data fields from Master.UEM_Callhomes that were selected using GUI module 120a to be included in the output generated by the computer-executable script. The names listed for the telemetry data fields in column 220 reflect the column names that will appear in the output.

According to the format of rules.csv, the telemetry data field in each row of column 210 is mapped to the corresponding Master.UEM_Callhomes telemetry data field in the same row. Further, the telemetry data file that includes each telemetry data field from column 210 is listed in column 205. As seen in column 205, the mapped telemetry data fields are found in three separate telemetry data files. Columns 225, 230, and 235 include attributes for each telemetry data field such as the data type and length (e.g., 8-bit integer, 10-character string, etc.) (column 225), an attribute indicating whether the data field can be assigned a null value (column 230), and whether there is a default value for the data field when no value is provided in the source telemetry data files from storage systems 110 (column 235).

It is noted that some of the telemetry data fields in column 210 do not have a corresponding telemetry data field in column 220, which instead indicates "UNKNOWN" in those rows of column 220 as well as columns 215, 225, and 235. These telemetry data fields are included in rules.csv because they are the columns on which a join operation between two telemetry data files can be based.

Further operation of system 100, and of modules 120b-120g, is described in detail below.

Preprocessing module 120b reads in the data structure description files (e.g., input.csv, output.csv, and rules.csv) as input. Based on the mapping described in rules.csv, preprocessing module 120b selects only the telemetry data files from input.csv having at least one telemetry data field mapped to a telemetry data field of the output, or required for facilitating a join operation. Preprocessing module 120b next iterates over the set of selected telemetry data files, and performs several operations related to each file. For example, file system path information is generated to facilitate loading each selected telemetry data file by the resulting Pig Latin statements. The full list of columns in each selected telemetry data file is read from input.csv, and Pig Latin statements are constructed for loading each telemetry data file and storing its contents (e.g., a full list of its columns) into a table.

The following pseudo code illustrates the operation of preprocessing module 120b:

```
generateLoadStatement( ) {
  table_list=list of tables from mapping rules file (e.g., FIG. 2, column 205);
  foreach (table in table_list) {
    loadStatement=table name+all columns of table from input.csv;
    PigLoadStatement=formatPigStatement(loadStatement);
    return pigLoadStatement;
  }
}
```

Exemplary Pig Latin load statements generated by preprocessing module 120b for rules.csv of FIG. 2 follow:

ConnectHome.Node_All=LOAD 'ConnectHome.Node.csv'
  USING PigStorage(',')
  AS (PK_NodeKey,FK_ConnectHomeKey,Status,State, ID);
ConnectHome.Node.Identifier_All=LOAD 'ConnectHome.Node.Identifier.csv'
  USING PigStorage(',')
  AS(PK_IdentifierKey,FK_NodeKey,DeviceState,DeviceStatus,ClarifyID,SiteName,Vendor, DeviceType, Model,SerialNumber,WWN,Platform,OS,OS_VER, UcodeVer,EmbedLevel, InternalMaxSize,Comment);
ConnectHome_All=LOAD 'ConnectHome.csv'
  USING PigStorage(',')
  AS(PK_ConnectHomeKey,SchemaVersion,TransType, TransTypeDesc,TransID);

As shown above, Pig Latin load statements are generated to load the contents of each of the selected telemetry data files identified in rules.csv to a table. For example, in the first Pig Latin load statement above, the telemetry data file "ConnectHome.Node.csv" is loaded, and all five of its column names listed in input.csv are stored to a table named "ConnectHome.Node_All." The load statements for the other selected telemetry data files are generated in a similar manner.

Content filtering module 120c reads as input one or more data structure description files describing the mapping rules for the fields of telemetry data (e.g., rules.csv) from a file path indicating the location of the data structure description file(s). Content filtering module 120c loads the tables created by preprocessing module 120b and iterates over each table to perform several operations related to each table. For example, content filtering module 120c filters the contents of each table to exclude the columns that are not present in rules.csv by iterating over each table and only selecting columns that have been mapped to an output column, or are required for a join operation. Content filtering module 120c constructs Pig Latin statements for creating filtered versions of the tables created by preprocessing module 120b that only include the columns listed in rules.csv, and further creates file system path information to facilitate loading the tables by the resulting Pig Latin statements.

The following pseudo code illustrates the operation of content filtering module 120c:

```
generateFilterStatement( ){
  tables=tables created by preprocessing module 120b;
  foreach (table of tables) {
    foreach (columnName in rules.csv for that table) {
      includedColumnNames+=columnName
    }
    filterStatement=filteredTable name+includedColumnNames
    PigFilterStatement=formatPigStatement(filterStatement);
    return pigFilterStatement;
  }
}
```

Exemplary Pig Latin statements for filtering the telemetry data tables generated by content filtering module 120c follow:

ConnectHome.Node=FOREACH ConnectHome.Node_ALL
  GENERATE
  Status,PK_NodeKey,FK_ConnectHomeKey;
ConnectHome=FOREACH ConnectHome_ALL
  GENERATE
  PK_ConnectHomeKey,SchemaVersion;
ConnectHome.Node.Identifier=FOREACH ConnectHome.Node.Identifier_ALL
  GENERATE
  EmbedLevel,PK_IdentifierKey,FK_NodeKey,InternalMaxSize,DeviceType,Platform, Model,SiteName,UcodeVer,OS_VER,SerialNumber;

As shown above, Pig Latin statements are generated to filter the contents of each table of telemetry data to exclude columns that are not found in rules.csv. For example, in the first Pig Latin statement above, the table "ConnectHome.Node_ALL" is loaded, and only those columns listed in rules.csv are stored to a table named "ConnectHome.Node." The Pig Latin statements filtering the tables are generated in a similar manner, and result in telemetry data tables having a reduced number of columns.

Join sequence module 120d performs operations to generate Pig Latin statements for joining all of the filtered telemetry data tables. The module can select the sequence of join operations to increase computational efficiency. Join sequence module 120d takes as input the data structure description files and the tables that were filtered by content filtering module 120c. For the initial join operation, join sequence module 120d identifies the least complex table from the list of filtered tables. The complexity of a table can be based on one or more factors such as the size of the table, the number of columns of telemetry data in the table, the number of rows of telemetry data in the table, the type of data that is stored in the table, and a commonality between the table and other tables in the list. In the example below, the complexity of each table is determined based on the product of the number of its columns and the number of its rows, with complexity being directly proportional to the magnitude of the product (i.e., the smaller the product, the lower the complexity, and vice versa, the larger the product, the greater the complexity).

After determining the least complex table, join sequence module 120d uses the contents of one or more of the data structure description files to determine which remaining tables are candidates to be joined with the least complex table. As described above, two tables can be joined on columns that have a known relationship between them. Accordingly, of the remaining tables in the list, only tables having a column related to one of the columns in the least complex table are candidates to be joined. After identifying the set of remaining tables that can be joined with the least complex table, join sequence module 120d selects the least complex table from the set and joins it with the least complex table it initially identified. Join sequence module 120d uses one or more of the data structure description files to determine the column from each table on which to join the tables, and generates and outputs Pig Latin statements to perform the join. The two tables that have been joined are removed from the table list during operation of join sequence module 120d, and if the list is not empty, the join process is repeated for the remaining tables in the list. For each subsequent join operation, join sequence module 120d takes the joined table that resulted from the prior operation and joins it with the least complex table remaining in the list that can be joined with the joined table based on a column relationship. After determining each join operation, join sequence module 120d generates and outputs Pig Latin statements for performing the join.

The operations of join sequence module 120d can provide several advantages. For example, the telemetry data tables can be extremely large data structures including more than a million rows of telemetry data. By sequencing the join operations such that the least complex tables get joined first, system memory and CPU utilization can be reduced. Further, since the join sequence is generated dynamically based on the complexity of the tables that have columns mapped to columns in the output format, join sequence module 120d adjusts the sequence for joining telemetry data tables in response to any changes that may occur in the format and content of the telemetry data files over time. The technology can generate a computer-executed script that is tailored to the format and contents of a set of telemetry data files, and can improve system efficiency. In some embodiments, the telemetry data tables are processed by a Hadoop MapReduce implementation distributed across several networked computing devices, and the operations of join sequence module 120d can reduce the network bandwidth associated with transferring the tables over a network.

The following pseudo code illustrates the operation of join sequence module 120d:

```
generateJoinStatement( ) {
    table_list=tables created by content filtering module 120c;
    while (table_list !EMPTY) {
        if (first join operation?) {
            T1=least complex table in table_list;
            table_list-=T1;
        }
        else T1=joinedTable;
        T2=least complex table in table list that can be joined with T1;
        table_list-=T2;
        joinCol_1=column from T1 that can be used to join to T2;
        joinCol_2=column from T2 that can be used to join to T1;
        joinedTable=T1+T2 joined on joinCol_1 and joinCol_2;
        pigJoinStatement=formatPigStatement(joinedTable);
        return pigJoinStatement;
    }
}
```

Exemplary Pig Latin statements generated by join sequence module 120d for joining ConnectHome and ConnectHome.Node follow:
JOIN_ConnectHome_AND_ConnectHome.Node=JOIN ConnectHome BY PK_ConnectHomeKey, ConnectHome.Node BY FK_ConnectHomeKey;

Based on the example described herein, join sequence module 120d generates Pig Latin statements to join ConnectHome (the least complex table), with ConnectHome.Node (the least complex table that can be joined with ConnectHome). A joined table is formed called JOIN_ConnectHome_AND_ConnectHome.Node that includes the columns of both tables created by content filtering module 120c. The Pig Latin statements are operable to join the tables at the PK_ConnectHomeKey column of ConnectHome.csv and the FK_ConnectHomeKey column of ConnectHome.Node.csv.

After joining the first two tables into a combined table as described above, a subsequent join operation generates Pig Latin statements for joining the previously-generated combined table with the third table in the described example, ConnectHome.Node.Identifier. The Pig Latin statements are operable to join the combined table on the PK_NodeKey column of ConnectHome.Node to the FK_NodeKey column of ConnectHome.Node.Identifier. Exemplary Pig Latin statements generated by join sequence module 120d for joining JOIN_ConnectHome_AND_ConnectHome.Node and ConnectHome.Node.Identifier follow:
JOIN_ConnectHome.Node_AND_ConnectHome. Node.Identifier=JOIN
JOIN_ConnectHome_AND_ConnectHome.Node BY ConnectHome.Node::PK_NodeKey, ConnectHome.Node.Identifier BY FK_NodeKey;

Data normalization module 120e performs operations to normalize the output column names and output file name. Data normalization module 120e reads in the data structure description files (e.g., input.csv, output.csv, and rules.csv) as input, as well as the table of joined telemetry data files created by join sequence module 120d. Data normalization module 120e identifies the output file name according to column 215 (FIG. 2) of rules.csv and constructs Pig Latin statements to create the output file. Data normalization module 120e then generates Pig Latin statements to populate the output file with renamed versions of the columns from the table of joined telemetry data files created by join sequence module 120d. To accomplish this, data normalization module 120e iterates over all of the telemetry data columns in the joined table (i.e., all of the telemetry data fields in column 210 (FIG. 2) of rules.csv) and generates Pig Latin statements operable to rename each column to the corresponding output column name from column 220 (FIG. 2) of rules.csv. The renaming logic of data normalization module 120e skips output columns for which the value of the column name is set to "UNKNOWN." In some embodiments, Pig Latin statements can be generated for creating a repository or file system for organizing the computer-executable script and related telemetry data files and tables discussed herein. The repository can be created in a computing memory (e.g., RAM) or storage device for storing and retrieving files and data sets (e.g., data structure description files, telemetry data files, telemetry data tables, computer-executable scripts, output files, etc.).

The following pseudo code illustrates the operation of data normalization module 120e:

```
normalizeOutputStmt( ) {
    generate Pig Latin statement to create output file named
        according to rules.csv (e.g., FIG. 2, column 215);
    foreach (outputColumnName in rules.csv (e.g., FIG. 2,
        column 220)) {
        if (outputColumnName !="UNKNOWN") {
            generate Pig Latin statement to rename the corre-
                sponding column in the joined table to outputCol-
                umnName;
        }
    }
}
```

Exemplary Pig Latin statements generated by content filtering module 120c for normalizing the joined telemetry data table and column names follow:

Master.UEM_CallHomes=FOREACH JOIN_ConnectHome.Node_AND_ConnectHome.Identifier GENERATE
  ConnectHome::PK_ConnectHomeKey AS pk_uem_call_home,
  ConnectHome::SchemaVersion AS schema_version,
  JOIN_ConnectHome.Node_AND_ConnectHome.Node.Identifier::ConnectHome.
Node::Status AS system_state,
  JOIN_ConnectHome.Node_AND_ConnectHome.Node.Identifier::ConnectHome.
Node.Identifier::EmbedLevel AS attachment_embedded_level,
  JOIN_ConnectHome.Node_AND_ConnectHome.Node.Identifier::ConnectHome.
Node.Identifier::InternalMaxSize AS attachment_max_size_ bytes,
  JOIN_ConnectHome.Node_AND_ConnectHome.Node.Identifier::ConnectHome.
Node.Identifier::DeviceType AS device_type,
  JOIN_ConnectHome.Node_AND_ConnectHome.Node.Identifier::ConnectHome.
Node.Identifier::Platform AS platform,
  JOIN_ConnectHome.Node_AND_ConnectHome.Node.Identifier::ConnectHome.
Node.Identifier::Model AS model,
  JOIN_ConnectHome.Node_AND_ConnectHome.Node.Identifier::ConnectHome.
Node.Identifier::SiteName AS reported_site_name,
  JOIN_ConnectHome.Node_AND_ConnectHome.Node.Identifier::ConnectHome.
Node.Identifier::UcodeVer AS reported_software_block,
  JOIN_ConnectHome.Node_AND_ConnectHome.Node.Identifier::ConnectHome.
Node.Identifier::OS_VER AS reported_software_file,
  JOIN_ConnectHome.Node_AND_ConnectHome.Node.Identifier::ConnectHome.
Node.Identifier::SerialNumber AS serial_number;

As shown above, and based on the example described herein, the Pig Latin statements generated by the data normalization module 120e define an output named "Master.UEM_CallHomes" and populate the output with columns from the joined table after renaming them according to the list of output columns in rules.csv. For example, operations of the Pig Latin statements rename the "PK_ConnectHomeKey" column that was originally sourced from the ConnectHome.csv telemetry data file to "pk_uem_call_home" to reflect the column name mapping in rules.csv. The other column names are renamed by the Pig Latin statements in a similar manner, and are included in the "Master.UEM_CallHomes" output file.

Output conditioning module 120f acts as an aggregator for the operations of the other modules 120. For example, output conditioning module 120f takes as input a superset of the input files used by modules 120, and initiates the execution of each module 120. Output conditioning module 120f further aggregates the resulting outputs of each module 120 and writes a concatenation of all of the Pig Latin statements generated by modules 120 to a file system in communication with computing device 105 (e.g., file storage 125, RAM-based data structure on computing device 105). In some embodiments, the file system is a Hadoop Distributed File System ("HDFS").

The following pseudo code illustrates the operation of output conditioning module 120f:

```
generatePIGScript({
    // call preprocessing module 120b
    loadStmt=generateLoadStatement( );
    // call content filtering module 120c
    forEachStmt=generateFilterStatement( );
    // call join sequence module 120d
    joinStmt=generateJoinStatement ( );
    // call data normalization module 120e
    normalizedOutputStmt=normalizeOutput( )=
    // Aggregate the Pig Latin statements and write to a file
    pigScript=loadStmt+forEachStmt+joinStmt+normalizedOutputStmt;
    return pigScript;
}
```

Script execution module 120g performs operations to execute the computer-executable script. For example, script execution module 120g can execute the Pig Latin statements generated by the modules 120 described herein. Execution of the computer-executable script is described in more detail below with respect to FIG. 4.

FIG. 3 is a flow chart illustrating a computer-implemented method 300 for generating a computer-executable script for processing storage system data files. For example, computing device 105 from FIG. 1 and its corresponding modules 120 can perform the method illustrated in FIG. 3. While the description of method 300 indicates that its method steps can be used to automate the generate computer-executable Pig Latin statements, it should be appreciated that the technology described herein could be used for automated generation of computer-executable statements for other technologies such as Apache Hive, Impala, scripts for table generation in Greenplum, etc.

At step 305, a computing device selects storage system data files from the plurality of storage system data files based on one or more data structure description files. For example, with reference to FIG. 1, the preprocessing module 120b of computing device 105 can read in data structure description files (e.g., input.csv, output.csv, and rules.csv) and based on those files, select only the telemetry data files having at least one telemetry data field mapped to a telemetry data field of the output, or required for facilitating a join operation.

At step 310, the computing device generates one or more computer-executable statements for loading the selected storage system data files into storage system data tables. For example, preprocessing module 120b of computing device 105 can iterate over the set of selected telemetry data files, and generate Pig Latin statements to perform several operations related to each file including. Preprocessing module 120b can generate file system path information to facilitate loading each selected telemetry data file by the Pig Latin statements it generates. Preprocessing module 120b reads from input.csv the full list of columns associated with each selected telemetry data file, and generates Pig Latin statements for loading each telemetry data file and storing its full list of columns into a table created for each telemetry data file.

At step 315, the computing device selects one or more storage system data fields from the storage system data tables based on the one or more data structure description files. For example, content filtering module 120c of computing device 105 can read in one or more data structure description files describing the mapping rules for the fields of telemetry data (e.g., rules.csv). Content filtering module 120c can load the tables created by preprocessing module 120b and iterate over each table to perform several operations related to each table. For example, content filtering module 120c can separately iterate over all of the column names in each table and only select columns that have been mapped to an output column in rules.csv, or are required for a join operation.

At step 320, the computing device generates one or more computer-executable statements for generating filtered storage system data tables by filtering the storage system data tables based on the selected storage system data fields. For example, content filtering module 120c can filter the contents of each table to exclude the columns that are not present in rules.csv by iterating over each table and generating Pig Latin statements that write only the selected columns from step 315 (i.e., the columns from each table that are listed in rules.csv) to filtered versions of the tables, and create file system path information to facilitate loading the filtered tables by the resulting Pig Latin statements.

At step 325, the computing device determines a join sequence for joining the filtered storage system data tables based on one or more properties of the filtered storage system data tables. For example, join sequence module 120d can perform operations as described above to generate Pig Latin statements for joining all of the filtered telemetry data tables in an optimized sequence based on the complexity of each filtered table.

At step 330, the computing device generates one or more computer-executable statements for joining the filtered storage system data tables into a joined table based on the join sequence. For example, after determining the tables to join based on their complexity, join sequence module 120d can generate Pig Latin statements operable to perform the join.

At step 335, the computing device formats the joined table based on the one or more data structure description files. For example, data normalization module 120e can read in as input the data structure description files and the joined table of telemetry data tables created by join sequence module 120d. The module can iterate over all of the telemetry data columns in the joined table (i.e., all of the telemetry data fields in column 210 (FIG. 2) of rules.csv) and modify the name of columns of the joined table that are mapped to an output column, and exclude column from the output for which the value of the column name is set to "UNKNOWN."

At step 340, the computing device generates one or more computer-executable statements for creating an output based on the formatted joined table. For example, data normalization module 120e can identify the output file name according to column 215 (FIG. 2) of rules.csv and construct Pig Latin statements to create the output file. Data normalization module 120e can generate Pig Latin statements to populate the output file with the renamed columns of the columns from the joined table created at step 335.

At step 345, the computing device generates the computer-executable script based on the one or more computer-executable statements for loading the selected storage system data files into storage system data tables, the one or more computer-executable statements for generating filtered storage system data tables by filtering the storage system data tables, the one or more computer-executable statements for joining the filtered storage system data tables in the join sequence, and the one or more computer-executable statements for creating a storage system data repository based on the formatted joined table. For example, output conditioning module 120f can act as an aggregator for the operations of the other modules 120. For example, output conditioning module 120f can take as input a superset of the input files used by modules 120, and initiate the execution of each module 120. Output conditioning module 120f can further aggregate the resulting outputs of each module 120 into a concatenation including all of the Pig Latin statements generated by modules 120.

At step 350, the computing device commits the computer-executable script to a file system in communication with the output processing module. For example, output conditioning module 120f can perform a series of write operations to commit the concatenation of Pig Latin statements to a file system in communication with computing device 105 (e.g., file storage 125).

Figure 4:
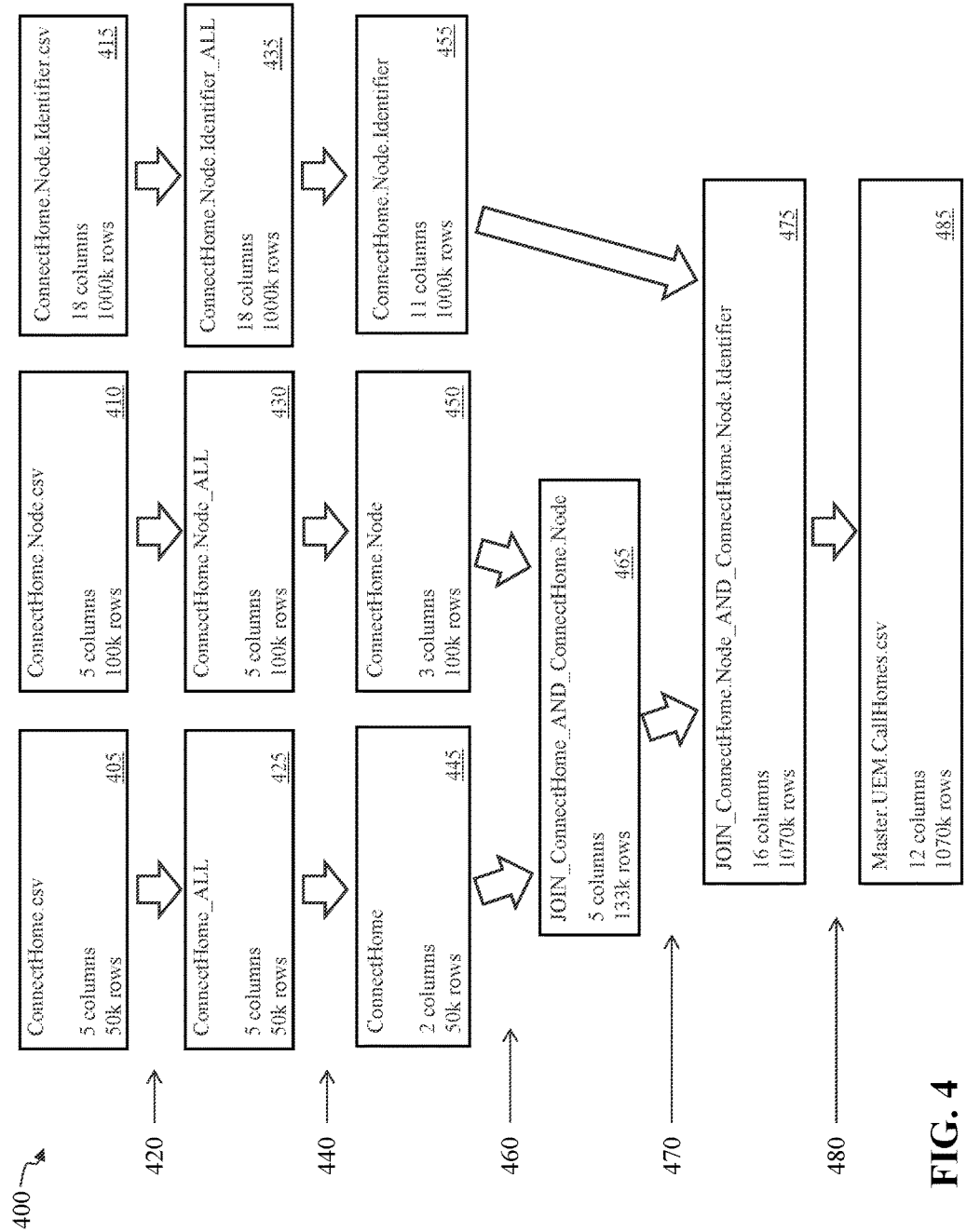
FIG. 4 depicts a flow diagram illustrating execution of a computer-executable script generated in accordance with the technology.

FIG. 4 depicts a flow diagram 400 illustrating execution of a computer-executable script generated in accordance with the technology.

At step 420, a computing device (e.g., computing device 105 and/or script execution module 120g) executing load statements (e.g., Pig Latin statements generated by preprocessing module 120b) loads the list of columns from selected telemetry data files 405, 410, and 415 into tables 425, 430, and 435, respectively. At step 440, the computing device (e.g., by executing Pig Latin statements generated by content filtering module 120c) filters the contents of tables 425, 430, and 435 and creates filtered tables 445, 450, and 455 for storing the filtered contents of tables 425, 430, and 435, respectively.

At steps 460 and 470, the computing device (e.g., by executing Pig Latin statements generated by join sequence module 120d) performs a sequence of join operations. At step 460, the computing device performs a first join operation which joins filtered tables 445 and 450. The number of columns in the resulting joined table 465 is the sum of the columns of filtered tables 445 and 450. The total number of rows is less than the sum of the rows of filtered tables 445 and 450 because some rows from each table are combined as a result of the join operation.

At step 470, a second join operation is performed to join filtered table 455 and joined table 465. The number of columns in the resulting joined table 475 is the sum of the columns of filtered table 455 and 465. The total number of rows is less than the sum of the rows of filtered table 455 and joined table 465 because some rows from each table are combined as a result of the join operation.

At step 480, the computing device (e.g., by executing Pig Latin statements generated by output conditioning module 120f) creates an output file. Further, the computing device renames each column of joined table 475 to the corresponding output column name. The computing device stores the output including the renamed columns to a file repository that can be created in a file storage or memory device.

It should be appreciated that the technology described herein can be used for dynamically generating a performance-optimized computer-executable script for processing telemetry data from devices other than storage systems. For example, the technology can be used for systems made up of a range of different types of equipment running different versions of software that each generates telemetry data files with different data fields populated. In one embodiment, the technology can be used for generating a computer-executable script for efficiently processing telemetry data received from components of a rail system such as trains and signal equipment.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites.

Method steps can be performed by one or more processors executing a computer program to perform functions of the technology by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, both general and special purpose microprocessors, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computer in communication with a display device, e.g., a CRT (cathode ray tube), plasma, or LCD (liquid crystal display) monitor, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of a computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Hypertext Transfer Protocol (HTTP), Session Initiation Protocol (SIP), a Global System for Mobile Communications (GSM) protocol, Universal Mobile Telecommunications System (UMTS), 3GPP Long Term Evolution (LTE) and/or other communication protocols.

Devices of a computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device includes, for example, a Blackberry® from Research in Motion, an iPhone® from Apple Corporation, and/or an Android™-based device.

Comprise, include, and/or plural forms of each are open ended and include the listed parts and can include additional parts that are not listed. And/or is open ended and includes one or more of the listed parts and combinations of the listed parts.

One skilled in the art will realize the technology may be embodied in other specific forms without departing from the spirit or essential characteristics thereof. The foregoing embodiments are therefore to be considered in all respects illustrative rather than limiting of the technology described herein.

What is claimed is:

1. A system for generating a computer-executable script for processing a plurality of storage system data files, the system comprising:

at least one memory; and
at least one processor configured to execute, out of the at least one memory, instructions of:
(i) a preprocessing module for:
   selecting selected storage system data files from the plurality of storage system data files based on one or more data structure description files; and
   generating one or more computer-executable statements for loading the selected storage system data files into storage system data tables;
(ii) a content filtering module for:
   selecting one or more storage system data fields from the storage system data tables based on the one or more data structure description files; and
   generating one or more computer-executable statements for generating filtered storage system data tables by filtering the storage system data tables based on the selected storage system data fields;
(iii) a join sequence module for:
   determining a join sequence for joining the filtered storage system data tables based on one or more properties of the filtered storage system data tables; and
   generating one or more computer-executable statements for joining the filtered storage system data tables into a joined table based on the join sequence;
(iv) a data normalization module for:
   formatting the joined table based on the one or more data structure description files; and
   generating one or more computer-executable statements for creating an output based on the formatted joined table; and
(v) an output conditioning module for:
   generating the computer-executable script based on the one or more computer-executable statements for loading the selected storage system data files into storage system data tables, the one or more computer-executable statements for generating filtered storage system data tables by filtering the storage system data tables, the one or more computer-executable statements for joining the filtered storage system data tables into the joined table based on the join sequence, and the one or more computer-executable statements for creating the output based on the formatted joined table; and
   committing the computer-executable script to a file system in communication with the output conditioning module,
   wherein the one or more properties of the filtered storage system data tables include complexities of the respective filtered storage system data tables, the complexities including lesser complexities and greater complexities, a predetermined amount of resources of the at least one memory and the at least one processor being required to determine the join sequence based on the complexities of the respective filtered storage system data tables, and wherein the at least one processor is further configured to execute, out of the at least one memory, the instructions of the join sequence module for joining, in the join sequence, the filtered storage system data tables having the lesser complexities before joining, in the join sequence, the filtered storage system data tables having the greater complexities to reduce the required predetermined amount of resources of the at least one memory and the at least one processor.

2. The system of claim 1 wherein the selected storage system data files are a subset of the plurality of storage system data files.

3. The system of claim 1 wherein the content filtering module is further configured to generate computer-executable statements for removing storage system data fields from the selected storage system data tables that do not match one of the selected storage system data fields.

4. The system of claim 1 wherein the join sequence module is further configured to determine a join sequence for joining the filtered storage system data tables based on one or more of: a size of each filtered storage system data table, a number of columns of data in each filtered storage system data table, a number of rows of data in each filtered storage system data table, and a commonality between the storage system data tables.

5. The system of claim 1 further comprising (vi) a graphical user interface module configured to generate the one or more data structure description files based on a selection of storage system data fields by a user.

6. The system of claim 1 wherein the computer-executable script includes computer-executable statements expressed in the Pig Latin programming language.

7. The system of claim 1 wherein the output conditioning module commits the computer-executable script to a Hadoop Distributed File System.

8. The system of claim 1 wherein the computer-executable script is configured to process storage system data files stored in a Hadoop Distributed File System.

9. A computer-implemented method executed on a computing device for generating a computer-executable script for processing a plurality of storage system data files, the method comprising the steps of:

selecting, by the computing device, selected storage system data files from the plurality of storage system data files based on one or more data structure description files;

generating, by the computing device, one or more computer-executable statements for loading the selected storage system data files into storage system data tables;

selecting, by the computing device, one or more storage system data fields from the storage system data tables based on the one or more data structure description files;

generating, by the computing device, one or more computer-executable statements for generating filtered storage system data tables by filtering the storage system data tables based on the selected storage system data fields;

determining, by the computing device, a join sequence for joining the filtered storage system data tables based on one or more properties of the filtered storage system data tables;

generating, by the computing device, one or more computer-executable statements for joining the filtered storage system data tables into a joined table based on the join sequence;

formatting, by the computing device, the joined table based on the one or more data structure description files;

generating, by the computing device, one or more computer-executable statements for creating an output based on the formatted joined table;

generating, by the computing device, the computer-executable script based on the one or more computer-executable statements for loading the selected storage system data files into storage system data tables, the one or more computer-executable statements for filtering the storage system data tables, the one or more computer-executable statements for joining the filtered storage system data tables into the joined table based on the join sequence, and the one or more computer-executable statements for creating the output based on the formatted joined table; and committing, by the computing device, the computer-executable script to a file system in communication with the computing device, the one or more properties of the filtered storage system data tables including complexities of the respective filtered storage system data tables, the complexities including lesser complexities and greater complexities, a predetermined amount of memory and processor resources of the computing device being required to determine the join sequence based on the complexities of the respective filtered storage system data tables, wherein determining the join sequence includes joining, in the join sequence, the filtered storage system data tables having the lesser complexities before joining, in the join sequence, the filtered storage system data tables having the greater complexities to reduce the required predetermined amount of memory and processor resources of the computing device.

10. The method of claim 9 wherein selecting selected storage system data files from the plurality of storage system data files comprises selecting, by the computing device, a subset of the plurality of storage system data files.

11. The method of claim 9 wherein generating one or more computer-executable statements for generating filtered storage system data tables by filtering the storage system data tables further comprises generating, by the computing device, computer-executable statements for removing storage system data fields from the selected storage system data tables that do not match one of the selected storage system data fields.

12. The method of claim 9 further comprising determining, by the computing device, the join sequence for joining the filtered storage system data tables based on one or more of: a size of each filtered storage system data table, a number of columns of data in each filtered storage system data table, a number of rows of data in each filtered storage system data table, and a commonality between the storage system data tables.

13. The method of claim 9 further comprising generating, by the computing device, the one or more data structure description files based on a selection of storage system data fields by a user.

14. The method of claim 9 wherein the computer-executable script is expressed in the Pig Latin programming language.

15. The method of claim 9 further comprising committing, by the computing device, an output of the computer-executable script to a Hadoop Distributed File System.

16. The method of claim 9 further comprising configuring, by the computing device, the computer-executable script to process storage system data files stored in a Hadoop Distributed File System.

17. A computer program product, tangibly embodied in a non-transitory computer readable storage medium, comprising instructions being operable to cause a computing device to:
- select selected storage system data files from a plurality of storage system data files based on one or more data structure description files;
- generate one or more computer-executable statements for loading the selected storage system data files into storage system data tables;
- select one or more storage system data fields from the storage system data tables based on the one or more data structure description files;
- generate one or more computer-executable statements for generating filtered storage system data tables by filtering the storage system data tables based on the selected storage system data fields;
- determine a join sequence for joining the filtered storage system data tables based on one or more properties of the filtered storage system data tables;
- generate one or more computer-executable statements for joining the filtered storage system data tables into a joined table based on the join sequence;
- format the joined table based on the one or more data structure description files;
- generate one or more computer-executable statements for creating an output based on the formatted joined table;
- generate a computer-executable script based on the one or more computer-executable statements for loading the selected storage system data files into storage system data tables, the one or more computer-executable statements for generating filtered storage system data tables by filtering the storage system data tables, the one or more computer-executable statements for joining the filtered storage system data tables into the joined table based on the join sequence, and the one or more computer-executable statements for creating the output based on the formatted joined table; and
- commit the computer-executable script to a file system in communication with the computing device,
- wherein the one or more properties of the filtered storage system data tables include complexities of the respective filtered storage system data tables, the complexities including lesser complexities and greater complexities, a predetermined amount of memory and processor resources of the computing device being required to determine the join sequence based on the complexities of the respective filtered storage system data tables, and
- wherein determining the join sequence includes joining, in the join sequence, the filtered storage system data tables having the lesser complexities before joining, in the join sequence, the filtered storage system data tables having the greater complexities to reduce the required predetermined amount of memory and processor resources of the computing device.

18. The computer program product of claim 17 further comprising instructions being operable to cause a computing device to generate computer-executable statements for removing storage system data fields from the selected storage system data tables that do not match one of the selected storage system data fields.

19. The computer program product of claim 17 further comprising instructions being operable to cause a computing device to determine the join sequence for joining the filtered storage system data tables based on one or more of: a size of each filtered storage system data table, a number of columns of data in each filtered storage system data table, a number of rows of data in each filtered storage system data table, and a commonality between the storage system data tables.

20. The computer program product of claim 17 further comprising instructions being operable to cause a computing device to generate the one or more data structure description files based on a selection of storage system data fields by a user.

* * * * *